US011157152B2

(12) United States Patent
Koetter et al.

(10) Patent No.: US 11,157,152 B2
(45) Date of Patent: Oct. 26, 2021

(54) INTERACTION MECHANISMS FOR POINTER CONTROL

(71) Applicant: SAP SE, Walldorf (DE)

(72) Inventors: Thomas Koetter, St. Leon Rot (DE); Daniel Intoppa, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/181,084

(22) Filed: Nov. 5, 2018

(65) Prior Publication Data

US 2020/0142568 A1 May 7, 2020

(51) Int. Cl.
*G06F 3/0484* (2013.01)
*G06F 3/033* (2013.01)

(52) U.S. Cl.
CPC ...... *G06F 3/04845* (2013.01); *G06F 3/04842* (2013.01); *G06F 3/033* (2013.01)

(58) Field of Classification Search
CPC .. G06F 3/0482; G06F 3/0481; G06F 3/04815; G06F 3/04842; G06F 3/0488; G06F 16/954; G06F 3/04817; G06F 3/0485; G06F 3/0486; G06F 3/04847; G06F 3/0346; G06F 16/24575; G06F 9/451; G06F 16/2455; G06F 2203/04806; G06F 3/0484; G06F 8/34; G06F 2203/04808; G06F 3/04812; G06F 2203/04104; G06F 3/0483; G06F 3/04845; G06F 3/033; H04N 21/42204; H04N 21/4858
See application file for complete search history.

(56) References Cited

U.S. PATENT DOCUMENTS 5,122,785 A * 6/1992 Cooper ............... G06F 3/03543
273/148 B
5,786,805 A * 7/1998 Barry .................. G06F 3/04812
345/159
5,793,369 A * 8/1998 Atkins ................ G06F 3/04847
714/E11.181

(Continued)

OTHER PUBLICATIONS

Lloyd Kent Konneker, "Tracking Handle Menu", Feb. 22, 2011. IP.com Prior Art Database Technical Disclosure, pp. 1-15 (Year: 2011).*

(Continued)

*Primary Examiner* — Tuyetlien T Tran
(74) *Attorney, Agent, or Firm* — Schwegman Lundberg & Woessner, P.A.

(57) ABSTRACT

Systems and methods are provided for determining, for each position of a pointer during a selection of a first graphical element, whether the position of the pointer corresponds to a boundary position in a GUI, and based on determining that the position of the pointer corresponds to the boundary position in the GUI, setting a position of the first graphical element to the boundary position even though the pointer continues to move beyond the boundary position during selection of the first graphical element. The systems and methods further provide for determining that the pointer position has moved beyond a predetermined threshold position for the boundary position and causing the first graphical element to move from the boundary position to the same position as the pointer and continue to move with the pointer during selection of the first graphical element.

17 Claims, 13 Drawing Sheets

(56) References Cited

U.S. PATENT DOCUMENTS

| | | | | |
|---|---|---|---|---|
| 5,896,491 A * | 4/1999 | Englefield | G06F 3/0481 | 715/839 |
| 5,900,872 A * | 5/1999 | Ashe | G06F 3/04855 | 345/157 |
| 5,977,972 A * | 11/1999 | Bates | G06F 3/04855 | 715/786 |
| 6,128,006 A * | 10/2000 | Rosenberg | G01C 21/36 | 345/161 |
| 6,191,785 B1 * | 2/2001 | Bertram | G06F 3/04847 | 345/157 |
| 6,300,936 B1 * | 10/2001 | Braun | G05B 19/00 | 345/156 |
| 6,545,664 B1 * | 4/2003 | Kim | G06F 3/012 | 345/158 |
| 6,717,600 B2 * | 4/2004 | Dutta | G06F 3/04842 | 715/856 |
| 7,149,983 B1 * | 12/2006 | Robertson | G06F 16/2428 | 715/810 |
| 7,475,351 B1 * | 1/2009 | Johnson | H04L 41/0873 | 715/736 |
| 7,696,979 B1 * | 4/2010 | Skergan | G06F 3/0482 | 345/157 |
| 7,916,157 B1 * | 3/2011 | Kelley | G06Q 10/109 | 345/619 |
| 8,386,927 B1 * | 2/2013 | Franklin | G06F 3/0482 | 715/701 |
| 8,407,608 B1 * | 3/2013 | Franklin | G06F 3/04812 | 715/756 |
| 8,416,237 B1 * | 4/2013 | Jain | G06T 15/20 | 345/420 |
| 8,775,952 B2 * | 7/2014 | Laugwitz | G06F 3/0482 | 715/763 |
| 8,856,682 B2 * | 10/2014 | Moore | G06F 3/0481 | 715/800 |
| 9,075,514 B1 * | 7/2015 | Karakotsios | G06F 3/0488 | |
| 9,100,218 B2 * | 8/2015 | Green | G06Q 10/107 | |
| 9,110,562 B1 * | 8/2015 | Eldawy | H04N 21/8456 | |
| 9,360,985 B2 * | 6/2016 | Sundstrom | G06F 3/0481 | |
| 9,401,099 B2 * | 7/2016 | Eckhardt | G06F 3/04886 | |
| 9,588,604 B2 * | 3/2017 | Zheng | G06F 3/038 | |
| 9,632,658 B2 * | 4/2017 | Holz | G06F 3/017 | |
| 9,747,696 B2 * | 8/2017 | Holz | G06K 9/00335 | |
| 9,927,880 B2 * | 3/2018 | Holz | B65D 75/5877 | |
| 9,928,661 B1 * | 3/2018 | Kinstner | A63F 13/00 | |
| 9,983,788 B2 * | 5/2018 | Laubach | G06F 3/0238 | |
| 10,503,264 B1 * | 12/2019 | Blachly | G06F 3/041 | |
| 2002/0171690 A1 * | 11/2002 | Fox | G06F 3/04812 | 715/862 |
| 2003/0043198 A1 * | 3/2003 | Delpuch | G06F 3/0485 | 715/784 |
| 2004/0104940 A1 * | 6/2004 | Giacomelli | G06F 3/0481 | 715/769 |
| 2004/0113946 A1 * | 6/2004 | Schlegel | G06F 3/0486 | 715/769 |
| 2004/0246269 A1 * | 12/2004 | Serra | G06F 3/0481 | 345/619 |
| 2005/0068290 A1 * | 3/2005 | Jaeger | G06F 3/04845 | 345/156 |
| 2006/0059437 A1 * | 3/2006 | Conklin, III | G06F 3/0481 | 715/800 |
| 2006/0070007 A1 * | 3/2006 | Cummins | G06F 16/2428 | 715/769 |
| 2007/0040800 A1 * | 2/2007 | Forlines | G06F 3/0325 | 345/158 |
| 2007/0198953 A1 * | 8/2007 | Baudisch | G06F 3/04842 | 715/856 |
| 2007/0216641 A1 * | 9/2007 | Young | G06F 3/04812 | 345/156 |
| 2007/0220448 A1 * | 9/2007 | Trewin | G06F 3/04812 | 715/856 |
| 2008/0229254 A1 * | 9/2008 | Warner | G06F 3/04812 | 715/856 |
| 2008/0244460 A1 * | 10/2008 | Louch | G06F 9/453 | 715/711 |
| 2008/0256440 A1 * | 10/2008 | Boreham | G06F 40/103 | 715/247 |
| 2009/0031257 A1 * | 1/2009 | Arneson | G06F 3/04812 | 715/862 |
| 2009/0079731 A1 * | 3/2009 | Fitzmaurice | G06F 3/04815 | 345/419 |
| 2009/0193195 A1 * | 7/2009 | Cochran | G06F 12/126 | 711/133 |
| 2009/0288012 A1 * | 11/2009 | Hertel | G06Q 20/02 | 715/738 |
| 2009/0327954 A1 * | 12/2009 | Danton | G06F 3/0481 | 715/810 |
| 2010/0145605 A1 * | 6/2010 | Valex | G08G 5/0021 | 701/532 |
| 2010/0162151 A1 * | 6/2010 | Class | G06F 3/0483 | 715/765 |
| 2010/0289807 A1 * | 11/2010 | Yu | G06F 3/04817 | 345/581 |
| 2010/0306702 A1 * | 12/2010 | Warner | G06F 3/0482 | 715/811 |
| 2010/0306710 A1 * | 12/2010 | Poot | G06F 3/017 | 715/856 |
| 2010/0309122 A1 * | 12/2010 | Abe | G06F 3/04812 | 345/157 |
| 2011/0145737 A1 * | 6/2011 | Laugwitz | G06F 3/0482 | 715/763 |
| 2011/0185316 A1 * | 7/2011 | Reid | G06F 3/0486 | 715/863 |
| 2012/0066628 A1 * | 3/2012 | Ens | G06F 16/9577 | 715/769 |
| 2012/0079382 A1 * | 3/2012 | Swenson | G06F 3/0482 | 715/716 |
| 2012/0092381 A1 * | 4/2012 | Hoover | G06F 3/04883 | 345/662 |
| 2012/0242581 A1 * | 9/2012 | Laubach | G06F 3/04812 | 345/168 |
| 2013/0074013 A1 * | 3/2013 | Tapiola | G06F 3/04883 | 715/859 |
| 2013/0093671 A1 * | 4/2013 | Yoo | G06F 3/0482 | 345/157 |
| 2013/0111322 A1 * | 5/2013 | Marum | G06F 40/174 | 715/223 |
| 2013/0132186 A1 * | 5/2013 | Paradies | G06Q 30/0231 | 705/14.31 |
| 2013/0151637 A1 * | 6/2013 | Bedikian | H04L 67/22 | 709/206 |
| 2014/0129990 A1 * | 5/2014 | Xin | G06F 3/017 | 715/849 |
| 2014/0137029 A1 * | 5/2014 | Stephenson | G06F 3/0486 | 715/784 |
| 2014/0173524 A1 * | 6/2014 | Schwesinger | G06F 3/04812 | 715/856 |
| 2014/0282145 A1 * | 9/2014 | Dewan | G06F 3/04842 | 715/765 |
| 2014/0282154 A1 * | 9/2014 | Petit | G06F 3/0488 | 715/765 |
| 2014/0282223 A1 * | 9/2014 | Bastien | G06F 3/0485 | 715/784 |
| 2014/0344731 A1 * | 11/2014 | Holz | G06F 3/04812 | 715/764 |
| 2015/0026618 A1 * | 1/2015 | Stone | G06F 3/04815 | 715/769 |
| 2015/0185873 A1 * | 7/2015 | Ofstad | G06F 16/29 | 345/158 |
| 2015/0220149 A1 * | 8/2015 | Plagemann | G06F 3/017 | 715/856 |
| 2015/0268744 A1 * | 9/2015 | Au | G06F 3/041 | 345/173 |
| 2015/0370529 A1 * | 12/2015 | Zambetti | G06F 3/0482 | 345/156 |
| 2016/0132139 A1 * | 5/2016 | Du | G06F 3/0414 | 345/173 |
| 2016/0188175 A1 * | 6/2016 | Dawari | G06F 3/0416 | 715/765 |

(56) References Cited

U.S. PATENT DOCUMENTS

| | | | |
|---|---|---|---|
| 2016/0210270 A1* | 7/2016 | Kelly | G06Q 10/10 |
| 2016/0299660 A1* | 10/2016 | Au | G06F 3/0481 |
| 2016/0313891 A1* | 10/2016 | Tsuda | G06F 3/04812 |
| 2016/0357430 A1* | 12/2016 | Migos | G06F 3/04883 |
| 2017/0018031 A1* | 1/2017 | Bandy | G06F 16/22 |
| 2017/0068418 A1* | 3/2017 | Tanaka | G06F 3/04812 |
| 2017/0123492 A1* | 5/2017 | Marggraff | H04N 5/247 |
| 2017/0153785 A1* | 6/2017 | Glaser | G06F 3/04812 |
| 2017/0357418 A1* | 12/2017 | Dunn | G06F 3/04845 |
| 2018/0095616 A1* | 4/2018 | Valdivia | H04L 51/16 |
| 2018/0173323 A1* | 6/2018 | Harvey | G06T 19/006 |
| 2018/0173410 A1* | 6/2018 | Chen | G06F 3/04845 |
| 2018/0356965 A1* | 12/2018 | Hagiwara | G06F 3/04845 |
| 2019/0034075 A1* | 1/2019 | Smochko | G06F 3/04842 |
| 2019/0361580 A1* | 11/2019 | Dowling | G06F 40/166 |
| 2019/0370545 A1* | 12/2019 | Josephson | G06T 19/006 |
| 2020/0051289 A1* | 2/2020 | Sharma | G06T 11/001 |

OTHER PUBLICATIONS

Disclosed Anonymously, Improved mouse handling to speed up UI mouse pointer movements, Jun. 27, 2005, IP.com Prior Art Database Technical Disclosure, pp. 1-3 (Year: 2005).*

* cited by examiner

INTERACTION MECHANISMS FOR POINTER CONTROL

BACKGROUND

Graphical user interfaces (GUIs) allow users to interact with electronic devices, such as computers and mobile devices, through graphical icons and visual indicators, as opposed to text-based interfaces, which rely on typed command labels or text navigation. GUIs have become the predominant mechanism to interface with electronic devices. GUIs may be built into an operating system of a device and may also be built into individual applications running in the operating system. One such individual application is a web browser which, in combination with a web page accessed by the web browser via the Internet, can render a GUI within the GUI of the operating system in which the web browser is operating. While the web browser GUI operates within the confines of the operating system GUI, it is a separate GUI with its own distinct functionality.

A pointing device may be used to select items (e.g., objects, values in a chart, etc.) in a GUI. A pointing device includes a mouse, trackball, joystick, touchpad, light pen, or the like. A user's finger or hand may also be used as a pointing device on a touch screen, for example. A user may use a pointing device to interact with a GUI to select values in a line chart, a range in a bar chart, an icon, an object in a drawing application, and so forth, by moving a pointer or cursor displayed on the GUI.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
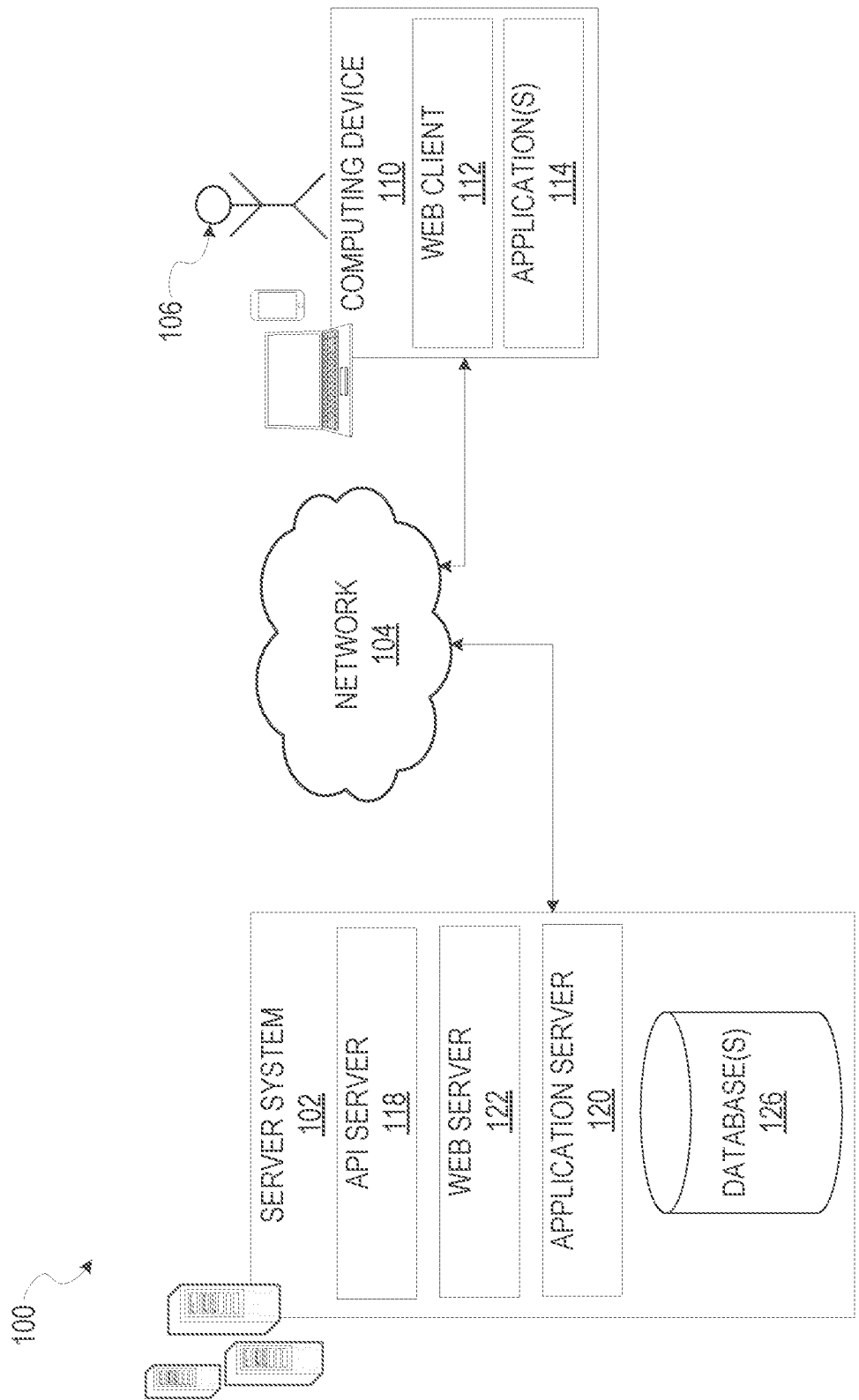
FIG. 1 is a block diagram illustrating a networked system, according to some example embodiments.

Systems and methods described herein relate to interaction mechanisms for pointer control. When selecting and moving items in a GUI using a pointing device (e.g., to move a pointer or a cursor), there is often a conflict between a more precise selection and a more constrained selection. The selection or movement of an item is done based on a projection of the pointer position on the GUI to specific values. Sometimes the goal is to select precise values, for example, to move a pointer in a GUI two decimal points on a line chart (e.g., to 8.03) or select a precise point at 8.03. Other times, the selection should be more constrained, for example, to move a pointer in a GUI to a full integer (e.g., to 8.00). In the latter case, some tools provide for a "snapping" behavior independent of pointer movement whereby when the pointer nears a full integer or another object or grid line (e.g., a constrained value), for example, the pointer or object snaps to the full integer or object/grid line. If the selection of constrained values is facilitated by such snapping behavior that automatically snaps the pointer to the next object or next full integer, for instance, it is not possible to select precise values close to the constrained value. In this case, perhaps the tool can provide the ability to enter precise values via text input, however, in an environment where the interaction is primarily (or entirely) done with a pointing device, this method means switching from the pointer to a keyboard (if available) which takes time and effort. A tool may also provide the ability to turn off the snapping functionality, however this also requires user interaction and knowledge of where to turn on or off such functionality. A tool may also allow modification of a granularity of a selection by applying a modifier key or enabling precise selection using a zoom function. These methods also require use of a keyboard and interrupt the selection process. Thus, if the required level of detail is not known up front or changes case by case, the selection procedure becomes tedious if the granularity of precision of the pointer movement is not appropriate.

Example embodiments address these technical limitations by allowing a pointer device to select precise values and then changing the selection behavior based on the pointer movement for constrained values (also referred to herein as boundary positions). For example, when a pointer is moved towards a constrained value, the selection is precise. When the pointer is moved away from or past a constrained value, the selection is sticky within a defined distance from the constrained value. For example, a graphical element being moved by the pointer stays (e.g., sticks) at a boundary position while the pointer keeps moving until the pointer reaches a defined distance from the constrained value, after which the graphical element will continue to be moved with the pointer. In one example, feedback is given during the selection process to alert a user to this behavior e.g., a change in the image of the pointer or other feedback).

Example embodiments apply to a variety of scenarios that involve selecting and moving a graphical element in a GUI, such as range selection where each border of the range can be selected, positioning objects in a layout, and selecting values, among other movement operations in a GUI. In this way, example embodiments allow both precise selection and easy selection of constrained values without requiring snapping functionality or additional steps to turn on and off snapping or other similar functionality.

FIG. 1 is a block diagram illustrating a networked system 100, according to some example embodiments, configured to provide interaction mechanisms for pointer control. The system 100 includes one or more computing devices such as a computing device 110. The computing device 110 may comprise, but is not limited to, mobile phones, desktop computers, laptops, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the computing device 110 comprises a display module (not shown) to display information (e.g., in the form of user interfaces). In further embodiments, the computing device 110 comprises one or more of touch screens, accelerometers, gyroscopes, cameras, microphones, Global Positioning System (GPS) devices, and so forth.

The computing device 110 may be a device of a user that is used to access, search, and display various information for e-commerce, location and map information, product information, travel information, and so forth. In one embodiment, the system 100 provides mechanisms for pointer control via one or more applications on the computing device 110 or accessed via the computing device 110.

One or more users 106 may be a person, a machine, or other means of interacting with the computing device 110. In example embodiments, the user 106 may not be part of the system 100, but may interact with the system 100 via the computing device 110 or other means. For instance, the user 106 provides input (e.g., touch screen input or alphanumeric input) to the computing device 110, and the input is communicated to other entities in the system 100 (e.g., a server system 102, other computing devices 110, third-party servers, etc.) via a network 104. In this instance, the other entities in the system 100, in response to receiving the input from the user 106, communicate information to the computing device 110 via the network 104 to be presented to the user 106. In this way, the user 106 interacts with the various entities in the system 100 using the computing device 110.

The system 100 may further include the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WIFI network, a WiMax network, another type of network, or a combination of two or more such networks.

The computing device 110 accesses the various data and applications provided by other entities in the system 100 via a web client 112 (e.g., a browser, such as the Internet Explorer® browser developed by Microsoft® Corporation of Redmond, Wash.) or one or more applications 114. The computing device 110 may include one or more applications 114 (also referred to as "apps") such as, but not limited to, a web browser, a messaging application, an electronic mail (email) application, an e-commerce site application, a mapping or location application, a drawing application, and the like. In some embodiments, one or more applications 114 are included in a given computing device 110, and configured to locally provide the user interface and at least some of the functionalities, with the one or more applications 114 configured to communicate with other entities in the system 100 (e.g., the server system 102, etc.), on an as-needed basis, for data and/or processing capabilities not locally available (e.g., to access location or map information, authenticate a user 106, verify a method of payment, etc.). Conversely, one or more applications 114 may not be included in the computing device 110, and then the computing device 110 may use its web browser to access the one or more applications hosted on other entities in the system 100 (e.g., the server system 102, etc.).

The server system 102 provides server-side functionality via the network 104 (e.g., the Internet or a wide area network (WAN)) to one or more computing devices 110. The server system 102 may be a cloud computing environment, according to some example embodiments. The server system 102, and any servers associated with the server system 102, may be associated with a cloud-based application, in some example embodiments.

The server system 102 includes an application programming interface (API) server 118, a web server 122, and an application server 120, that may be communicatively coupled with one or more databases 126. The databases 126 comprise storage devices that store information such as application data, user data, and the like. The API server 118 may be used by third-party servers or other computing devices to interact with the server system 102 via a programmatic interface provided by the API server 118. For example, computing devices request and utilize information from the server system 102 via the API server 118 to support one or more features or functions on a website hosted by a third party or an application hosted by the third party. The third-party website or application may provide capabilities that are supported by relevant functionality and data in the server system 102.

Figure 2:
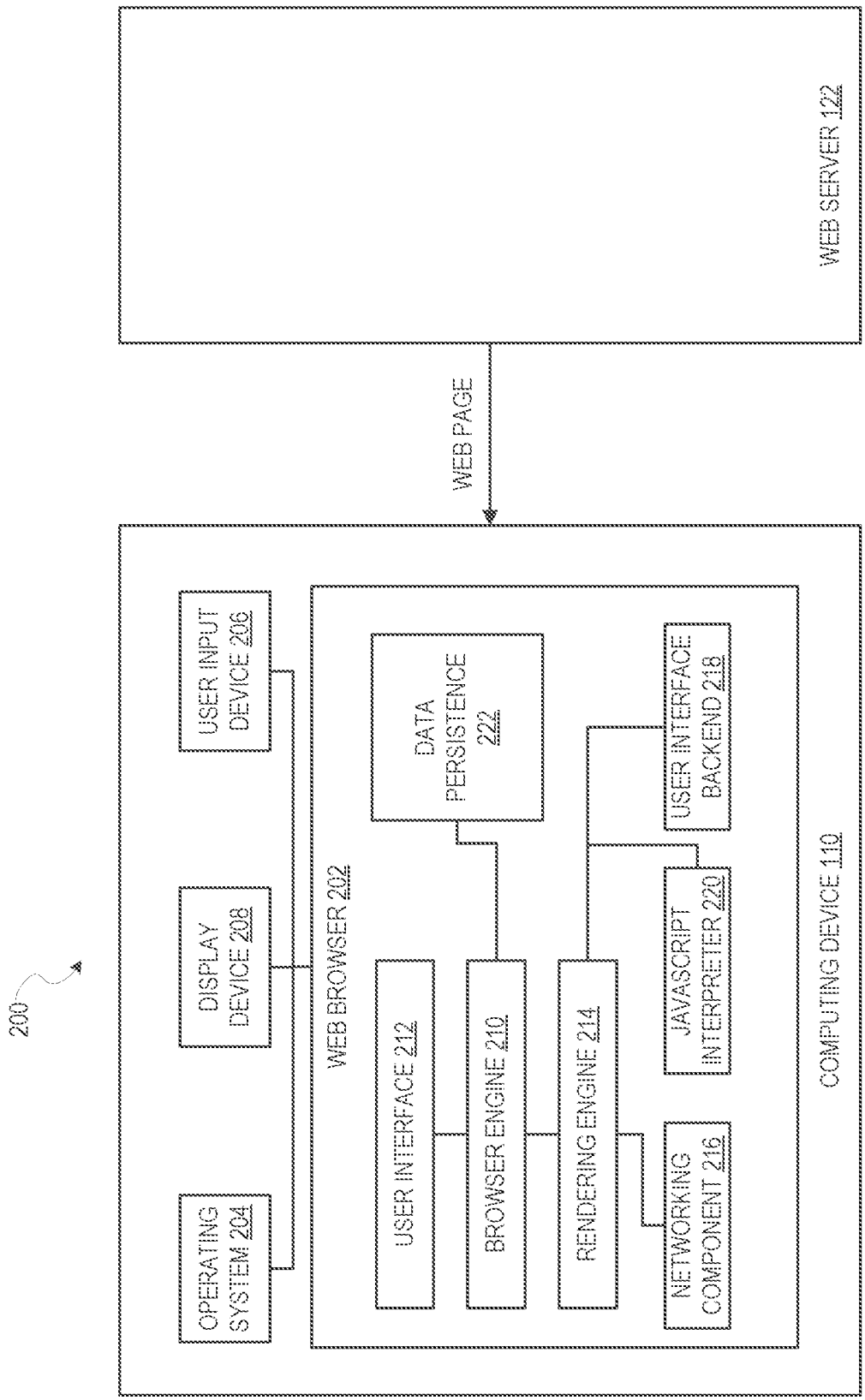
FIG. 2 is a block diagram illustrating a system including a web browser, according to some example embodiments.

FIG. 2 is a block diagram illustrating a system 200 including further details of the computing device 110 and the web server 122 shown in FIG. 1. The system 200 includes a web browser 202, according to some example embodiments. The system 200 represents one example system that can be used to implement the pointer control functionality. In one example, the pointer control functionality is implemented as a JavaScript or similar scripting language element, executed in the web browser 202 on the computing device 110. Implementation of the pointer control functionality is not limited to a JavaScript or similar scripting language element, and other systems may be used to implement the pointer control functionality.

The computing device 110 may be, for example, a desktop computer, laptop computer, tablet computer, smart phone, smart watch, or any other computing device capable of displaying a GUI via a scripting language and web browser combination. It should be noted, however, that the further systems described later need not be limited to those computing devices capable of displaying a GUI via a scripting language and web browser combination and can, in fact, include any computing devices capable of displaying a GUI.

The system 200 includes the computing device 110 as well as the web server 122. The web server 122 delivers a web page to the computing device 110 upon request. This request may either be explicit by the user of the computing device 110, such as by navigating the web browser 202 to a specific web address, or may be implicit or automatic. The web page may, for example, be in the form of Hypertext Markup Language (HTML) code or other markup language code, which may incorporate various calls and/or scripts through languages such as Cascading Style Sheets (CSS) and Java.Script.

An operating system 204 on the computing device 110 controls interactions between the web browser 202 and a user input device 206. In other words, the operating system 204 can detect when a user interacts with the web browser 202 via input to the user input device 206 and transmit such interactions to the web browser 202. Examples of user input devices 206 include mice, keyboards, touchpads, touch screens, microphones, and any other devices capable of receiving user input. User input devices 206 are also referred to herein as pointing devices. The web browser 202 can output rendered GUI elements on a display device 208 of the computing device 110. In some example embodiments, the display device 208 and the user input device 206 are the same device, such as in the case of a touch screen.

The web browser 202 contains its own user interface 212 (which may display, for example, an address bar, back/forward button, bookmarking menu, etc.). A browser engine 210 marshals actions between the user interface 212 and a rendering engine 214. The rendering engine 214 is responsible for rendering content (e.g., web pages). The rendering engine 214 may contain one or more specialized parsers (e.g., an HTML parser, a CSS parser) for this purpose.

A networking component 216 handles calls such as Hypertext Transfer Protocol (HTTP) calls to and from the web server 122, using different implementations based on the platform, and typically behind a platform-independent interface. A user interface backend 218 handles drawing basic web page components such as buttons and windows. A JavaScript interpreter 220 is used to parse and execute JavaScript code found in a web page parsed by the rendering engine 214. Finally, data persistence 222 is a layer that allows the web browser 202 to save various types of data locally, such as cookies.

In an example embodiment, specialized JavaScript code is provided to the JavaScript interpreter 220, either via a downloaded web page or by directly modifying one or more JavaScript libraries utilized by the JavaScript interpreter 220, which causes modification of behavior of a pointer GUI element in the user interface backend 218. This modification causes the corresponding pointer element to, when displayed, act in a dynamic manner in response to a user action to select, move, or otherwise interact with the GUI.

Figure 3:
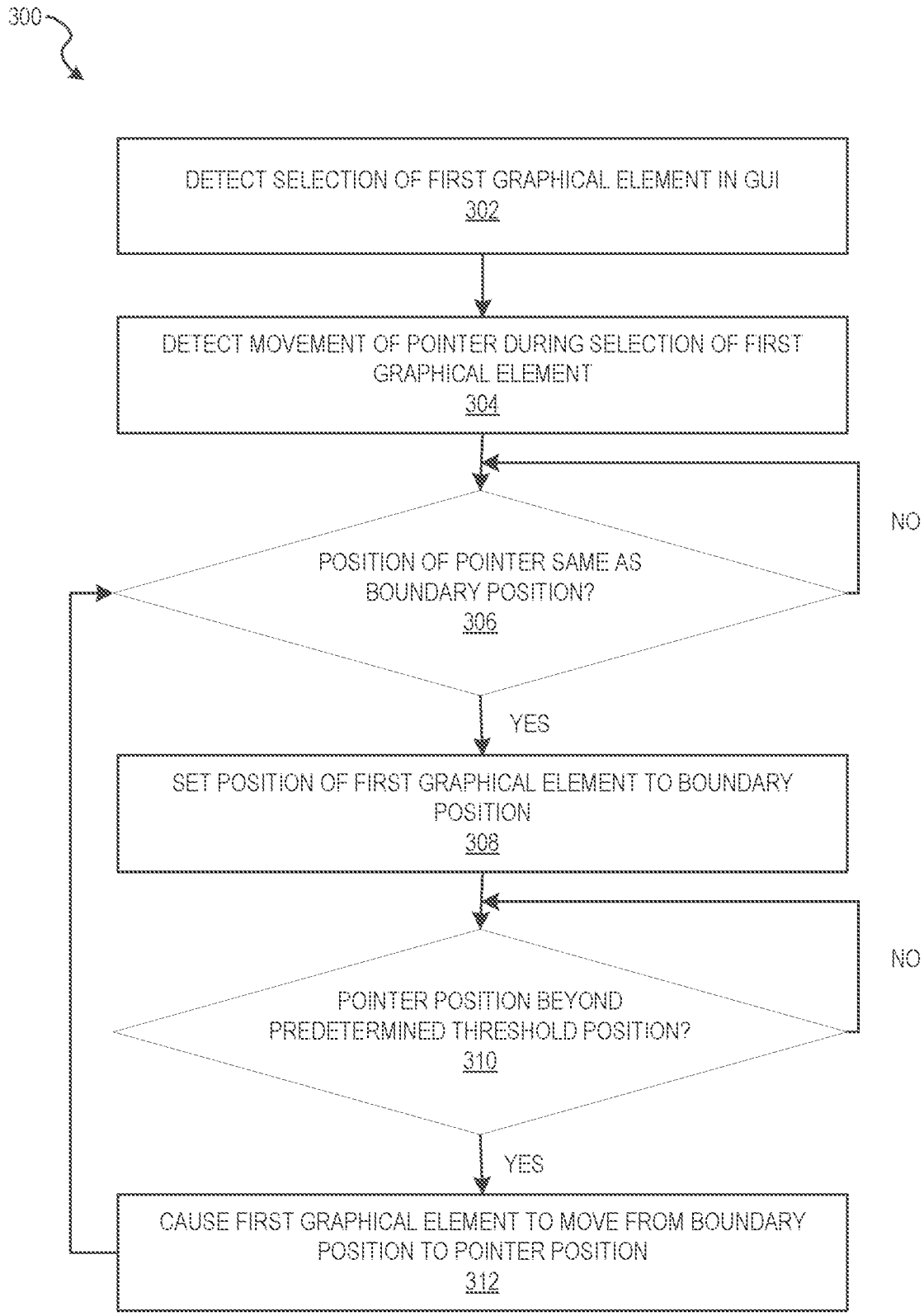
FIG. 3 is a flowchart illustrating aspects of a method, according to some example embodiments.

FIG. 3 is a flow chart illustrating aspects of a method 300, according to some example embodiments, for behavior of a pointer during selection of a graphical element in a GUI. For illustrative purposes, the method 300 is described with respect to the networked system 100 of FIG. 1. It is to be understood that the method 300 may be practiced with other system configurations in other embodiments.

In operation 302, a computing device (e.g., the computing device 110) detects a selection, via a pointer, of a first graphical element in a graphical user interface (GUI). For example, a user, using a pointing device, moves a pointer on the GUI to select a graphical element in the GUI. For instance, the user can move a mouse to move the pointer to the graphical element in the GUI and press or press and hold down a mouse button to select the graphical element.

Figure 4:
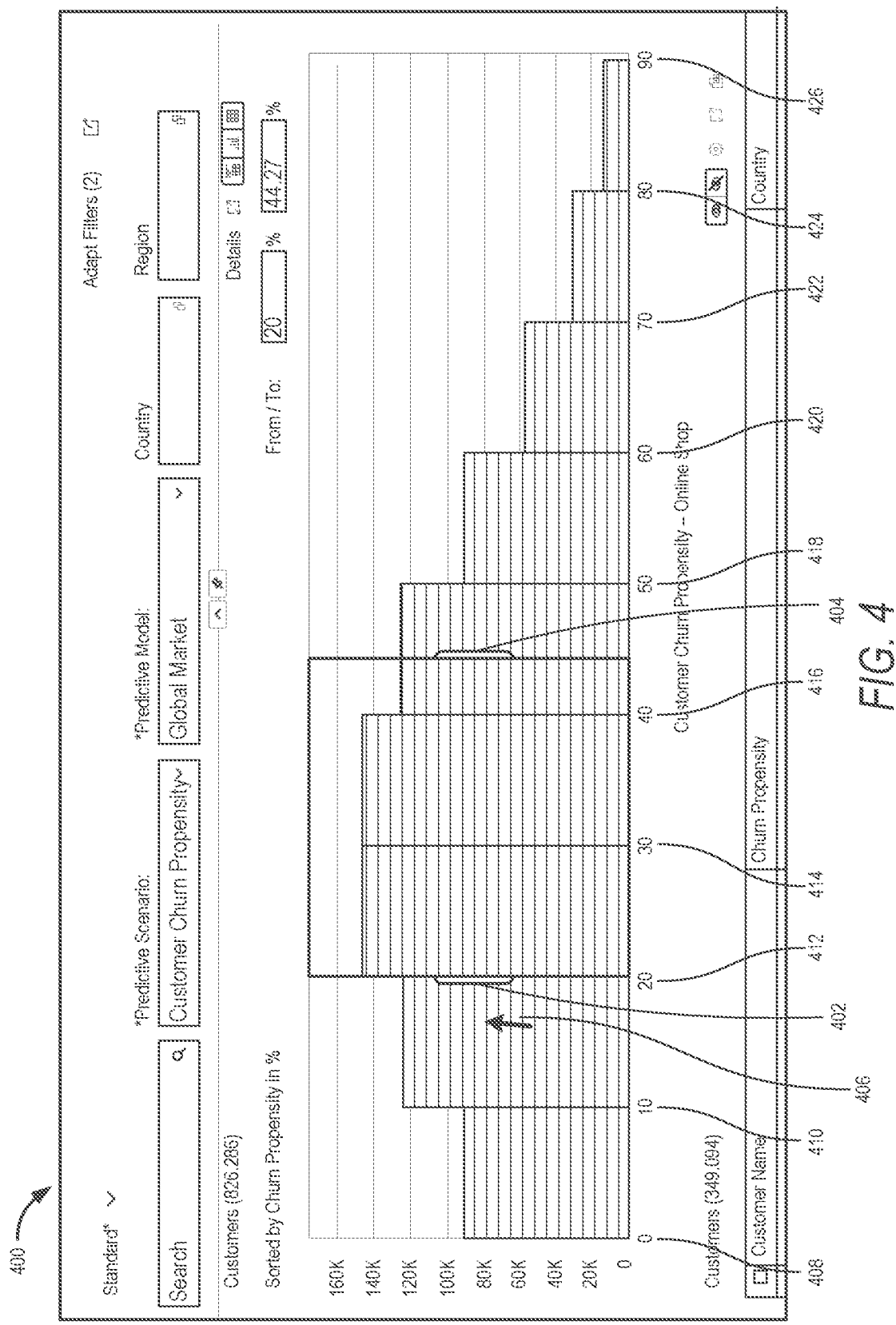
FIGS. 4-10 illustrate example GUIs, according to some example embodiments.

FIG. 4 illustrates an example GUI 400 showing a chart indicating customer churn propensity. In this example, there are two selection sliders 402 and 404 in the chart as example graphical elements that may be selected. It is to be understood that there may be any number or type of graphical elements that may be selected in a GUI besides just the example selection sliders 402 and 404. In the example in FIG. 4, a user can move a pointing device to cause a pointer 406 to move to one of the selection sliders 402 or 404. For example, the pointer 406 can be moved to the selection slider 402, and a button may be pressed on the pointing device or a position of the pointer 406 may be held over the selection slider 402 to select the selection slider 402. The user can then use the pointing device to move the pointer 406, and thus the selection slider 402, during selection of the selection slider 402. FIG. 4 also shows example boundary positions 408-426, which are described below.

Figure 5:
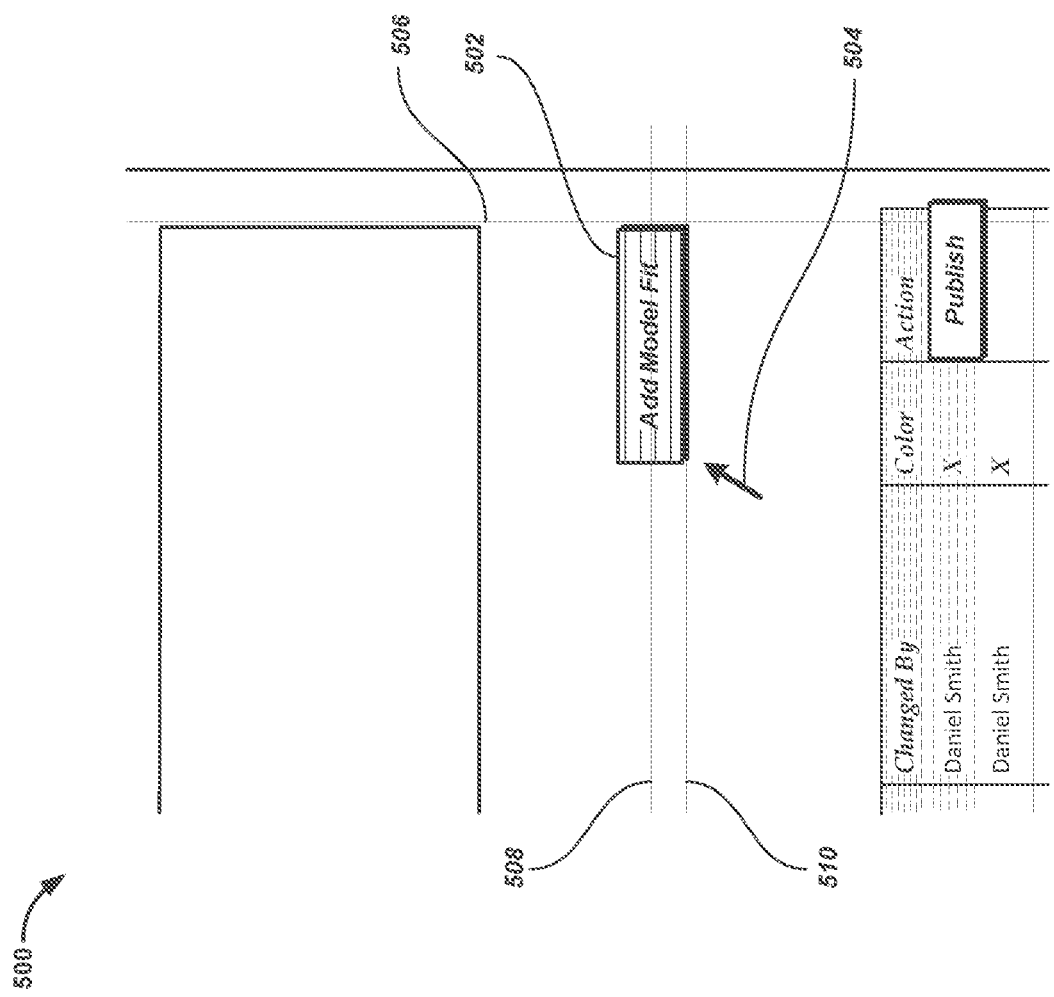

FIG. 5 illustrates an example portion of a GUI 500 for a drawing application that allows placement of various graphical elements in the GUI 500. In this example, there is one graphical element shown as an object 502 "Add Model Fit." It is to be understood that there may be any number or type of graphical elements that may be selected in a GUI, as explained above. As also explained above, a user can move a pointing device to cause a pointer 504 to move to the object 502. For example, the pointer 504 can be moved to the object 502, and a button may be pressed on the pointing device or a position of the pointer 504 may be held over the object 502 to select the object 502. The user can then use the pointing device to move the pointer 504, and thus the object 502, during selection of the object 502. Also shown in the GUI 500 are a vertical line 506 and two horizontals lines 508 and 510. These lines appear when moving an object so that the object may be snapped to the lines in conventional application. More detail about how these lines may be used in example embodiments is explained below.

Figure 6:
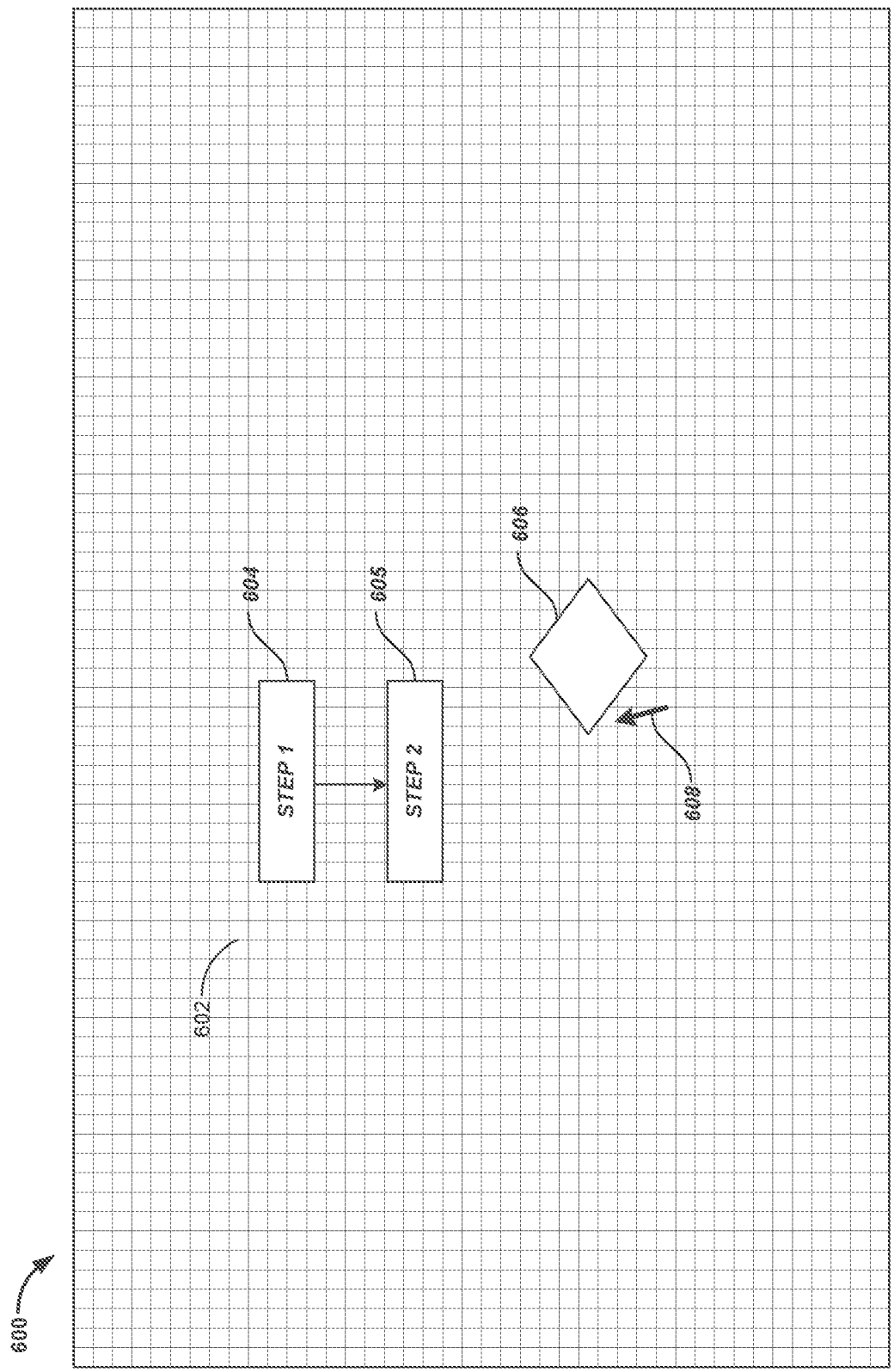

FIG. 6 illustrates an example GUI 600 for an application to create diagrams and allow placement of various graphical elements, such as objects 604, 605, and 606. A user can move a pointing device to cause a pointer 608 to move and select any of the objects 604, 605, or 606 (or other objects added to the diagram), as explained above with respect to FIGS. 4 and 5. Also shown in the GUI 600 is a grid 602 that is laid out as the background of the diagram. This grid 602 is provided so that an object may be snapped to the lines in the grid 602 in conventional application. More detail about how the grid 602 may be used in example embodiments is explained below.

Returning to FIG. 3, in operation 304, the computing device detects movement of the pointer during selection of the first graphical element in the GUI. For instance, after a user selects the first graphical element, the user then moves the pointing device to cause the pointer and the first graphical element to move in the GUT The computing device detects this movement of the pointer during selection (e.g., while the user is holding down the mouse button). The position of the first graphical element is set to the position of the pointer in the GUI such that the first graphical element moves with the movement of the pointer during the selection of the first graphical element.

In operation 306, the computing device determines, for each position of the pointer during the selection (and movement) of the first graphical element, whether the position of the pointer corresponds to (e.g., is the same or similar to) a boundary position in the GUI. For example, the computing device compares a position (e.g., location in the GUI) of the pointer to a boundary position (e.g., location) in the GUI. A boundary position in a GUI may be a numerical value in the GUI (e.g., 20 in a line or bar graph), a position of a line in the GUI (e.g., an x-axis and/or y-axis position of the line), a position of one or more lines in a grid in the GUI (e.g., an x-axis and/or y-axis position of the one or more lines), a position of a second graphical element in the GUI (e.g., based on an x-axis and/or y-axis position, numerical value, etc.), or the like.

For example, in FIG. 4 each increment of 10 in the x axis of the bar chart is a boundary position. For instance, a first boundary position 408 is at the numerical value 0, a second boundary position 410 is at a numerical value 10, a third boundary position 412 is at a numerical value 20, and so forth for the rest of the boundary positions 414-426. In this example, the boundary position may be the actual numerical value (e.g., 10, 20, 30) or the boundary position may simply be an x-axis position at the particular numerical value. In other examples, a boundary position may be a y-axis position, or be an x-axis and a y-axis position. Using the example in FIG. 4, the computing device compares the numerical value associated with the position of the pointer during selection of the first graphical element to the numerical value of the boundary position. For example, a pointer may be at 22.3 in the chart in FIG. 4, and the boundary position near the pointer may be a numerical value of 20. The computing device would compare 22.3 to 20 to determine that the position of the pointer does not correspond to (e.g., is not the same) as the boundary position.

Also using the example in FIG. 4, in another example embodiment, the computing device compares the x-axis position (e.g., a value associated with the x axis) of the pointer during selection of the first graphical element to the x-axis position (e.g., a value associated with the x axis) of the boundary position. For example, if the selected graphical element is the selection slider 402, the computing device would determine that the position of the pointer corresponds to (e.g., is the same as) the boundary position since the x-axis position of the pointer (e.g., at the selection slider 402) is the same as the x-axis position of the boundary position 412. As another example, if the selected graphical element is the selection slider 404, the computing device would determine that the position of the pointer does not correspond to (e.g., is not the same as) any boundary position since the x-axis position of the pointer (e.g., at the selection slider 404) is not the same as the x-axis position of any boundary positions (e.g., the pointer would be in between boundary positions 416 and 418).

In the example potion of the GUI 500 of FIG. 5, each line 506, 508, and 510 is a boundary position. Accordingly, the boundary position 506 may simply be an x-axis position, and each of the boundary positions 508 and 510 may simply be a y-axis position. Thus, the computing device compares the x-axis or the y-axis position of the pointer during selection of the first graphical element (e.g., the object 502) to the x-axis or y-axis position of the boundary positions 506, 508, and 510 as appropriate, as in the method explained above for the example in FIG. 4.

In the example GUI 600 of FIG. 6, each line in the grid 602 is a boundary position. An intersection of lines, a corner created by two lines, and so forth may also be a boundary position. As in the examples explained above with respect to FIGS. 4 and 5, the computing device compares an x-axis or a y-axis position (or both) of the pointer during selection of the first graphical element (e.g., the object 604, 605, or 606) to an x-axis position, y-axis position, or both of a nearby boundary position, as appropriate.

Figure 7:
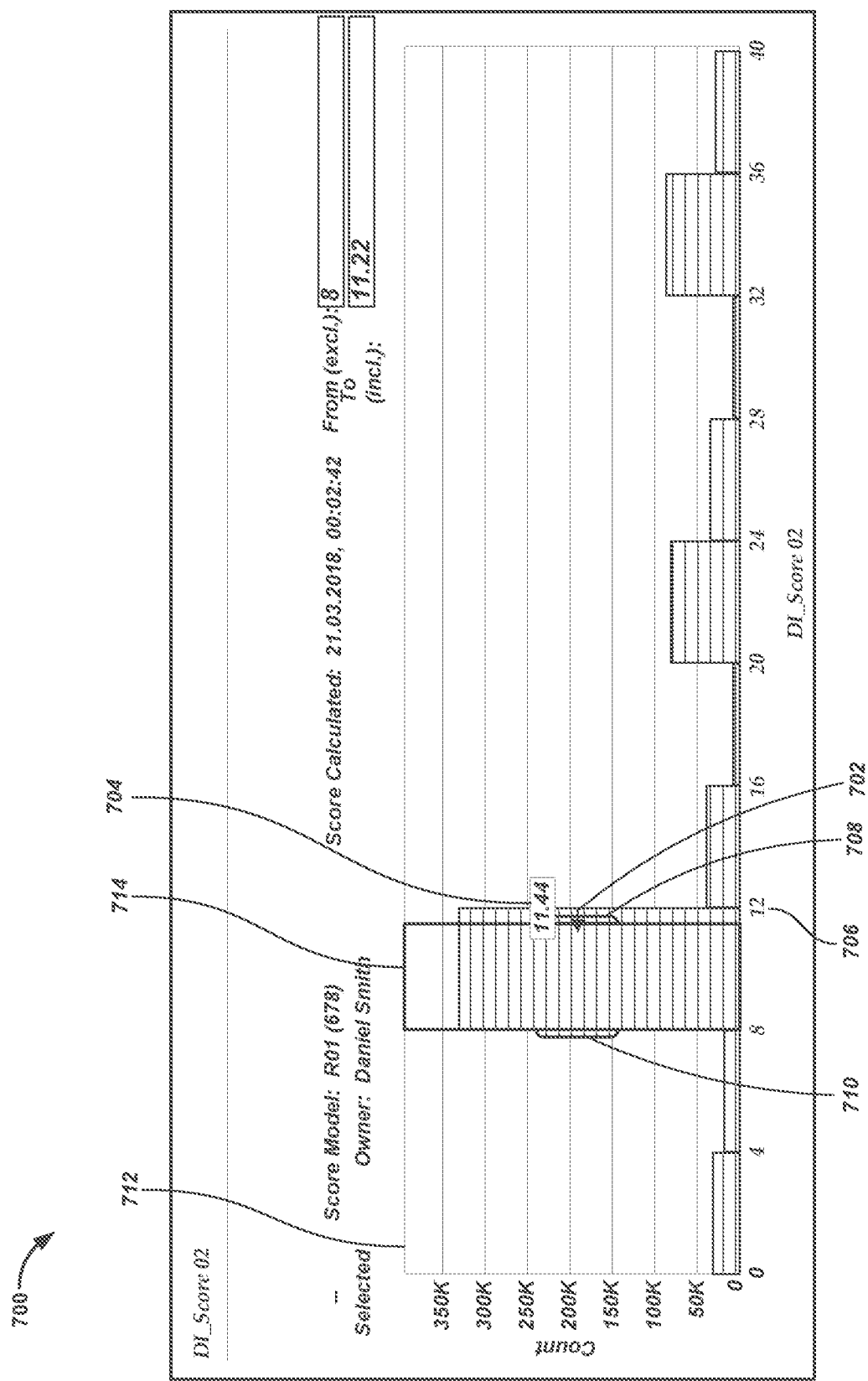
Figure 8:
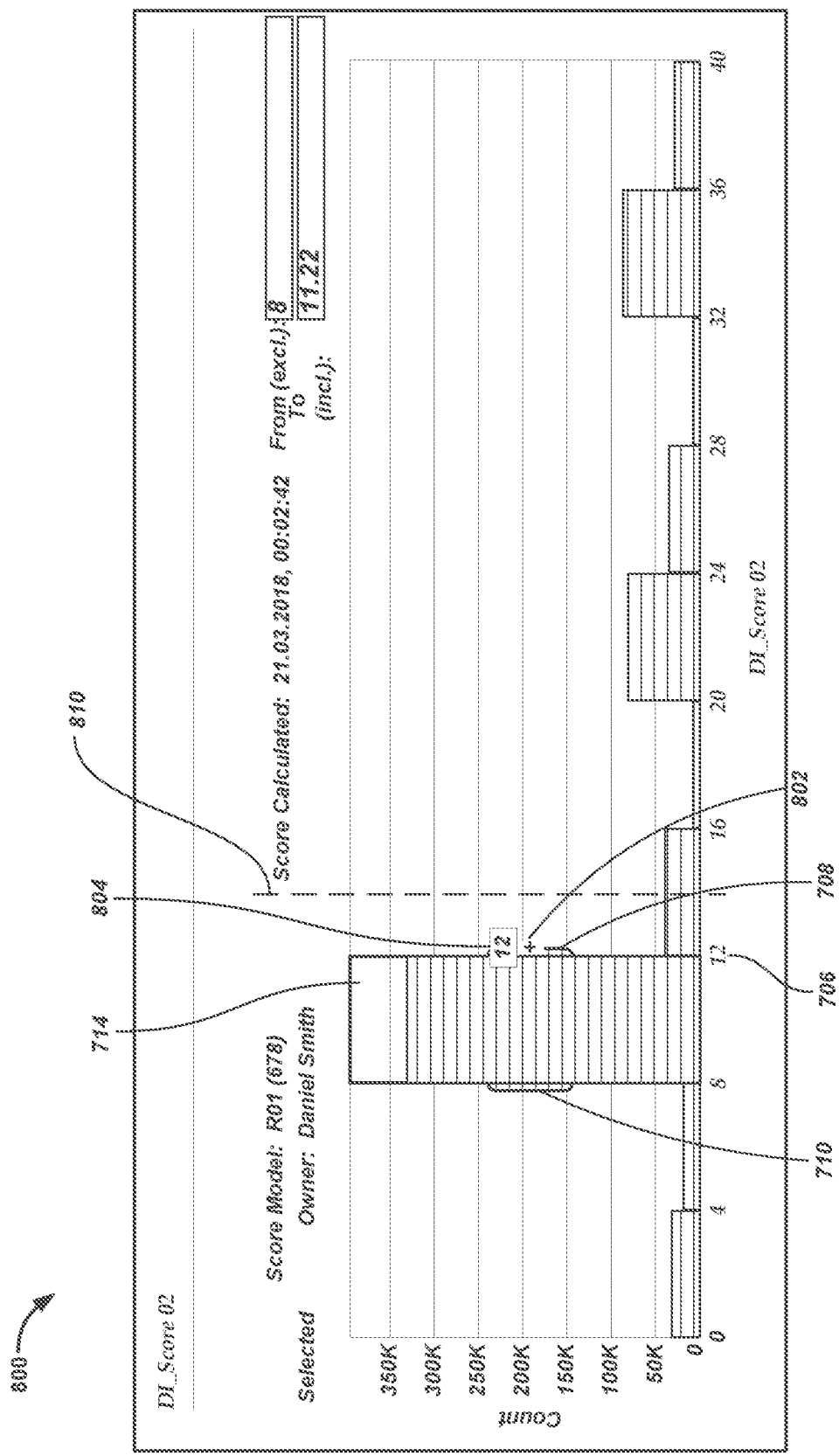

Returning to FIG. 3, if the position of the pointer during selection of the first graphical element does not correspond to (e.g., is not the same as) a boundary position in the GUI, the method 300 returns to operation 306 for analysis of the next pointer position during the selection of the first graphical element. If the position of the pointer during selection of the first graphical element does correspond to (e.g., is the same as) a boundary position in the GUI, then at operation 308 the computing device sets the position of the first graphical element to the boundary position. For example, the computing device sets the position of the first graphical element to the boundary position even though the pointer continues to move beyond the boundary position during selection of the first graphical element. Thus, the first graphical element stays static at the boundary position in the GUI while the pointer is shown as continuing to move beyond the boundary position (e.g., and is no longer "attached" to the first graphical element). In other words, the pointer is displayed separate from the first graphical element when the pointer continues to move beyond the boundary position during selection of the first graphical element. FIGS. 7 and 8 provide an illustration of this behavior.

FIG. 7 shows an example GUI 700 displaying a bar chart 712 and graphical elements 708 and 710 that can be selected to move/change a range selection 714 in the bar chart 712. In this example, the graphical element 708 is selected and being moved using a pointer 702 in a direction towards a boundary position 706 (e.g., with value 12). As can be seen, the position of the pointer 702 (and thus also the position of the graphical element 708) is currently at 11.44 (704).

FIG. 8 shows an example GUI 800 where the selected graphical element 708 is static at the boundary position 706 (e.g., value 12 (804)) but the pointer 802 continues to move in the direction of movement indicated by a pointing device. In this example, the pointer 802 changes from an arrow pointer to a plus-symbol pointer to indicate this change. In other examples, no change to the pointer may be made. FIG. 8 also shows an example predetermined threshold position 810, which is explained below.

Returning to FIG. 3, in operation 310, the computing device determines whether or not the pointer position has moved beyond a predetermined threshold position for the boundary position. In one example, a predetermined threshold position is a predetermined distance away from the boundary position. The distance from the boundary position may be based on a number of pixels, a font size, a percentage of a display size of the GUI, a percentage of a size of the graphical element, a percentage of a size of a graph or chart, or another measure from a boundary position. For example, in FIG. 8, the predetermined threshold position 810 is a value of 2 away from the boundary position 706 (e.g., at value number 14 on the y axis of the bar chart for the particular boundary position 706 with value 12 (804)). In another example, the predetermined threshold position could be a number of pixels (e.g., 10 pixels) from the boundary position, based on a font size (e.g., the font size of text in the GUI or chart as measured using the largest letter M, or a percentage of the font size), or based on other means for determining a distance from or surrounding a boundary position.

Figure 9:
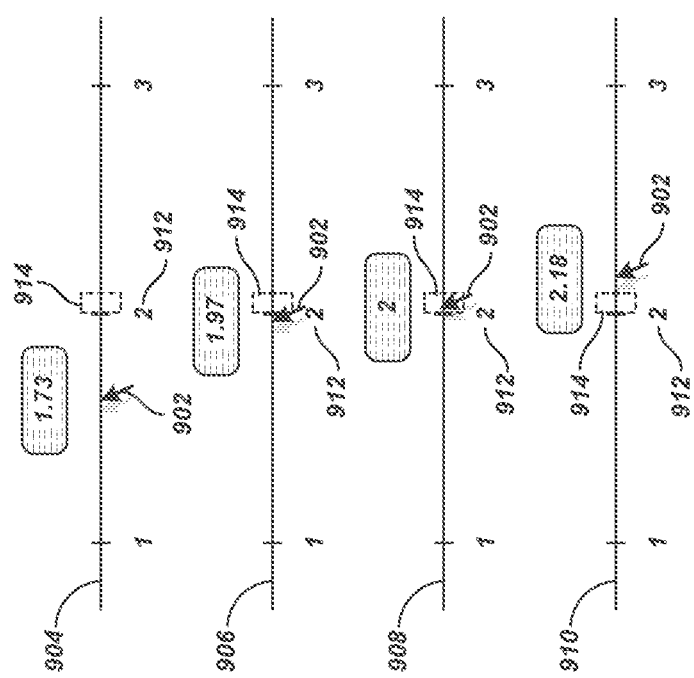

In one example, the predetermined threshold position is a predetermined distance away from the boundary position based on a direction of movement of the pointer. FIG. 9 illustrates switching areas of resistance (e.g., predetermined threshold position) on a numerical axis based on a direction of a pointer movement. In FIG. 9, a pointer 902 is moving from left to right. Using a boundary position 912 (e.g., value 2 on the numerical axis) as an example, a predetermined threshold position 914 (e.g., area of resistance) is to the right of the boundary position 912. In example 904, the pointer position is at 1.73; in example 906, the pointer position has moved to 1.97; in example 908, the pointer position has moved to the boundary position (2), and then beyond the predetermined threshold position to 2.18 in example 910.

Figure 10:
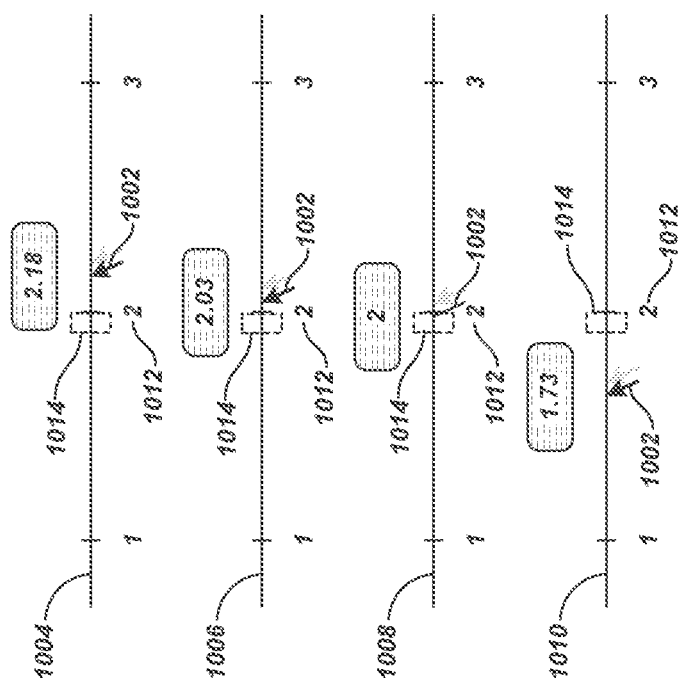

FIG. 10 illustrates switching areas of resistance (e.g., predetermined threshold position) on a numerical axis based on a direction of a pointer movement. In FIG. 10, a pointer 1002 is moving from right to left. Using a boundary position 1012 (e.g., value 2 on the numerical axis) as an example, a predetermined threshold position 1014 (e.g., area of resistance) is to the left of the boundary position 1012. In an example 1004, the pointer position is at 2.18; in an example 1006, the pointer position has moved to 2.03; in an example 1008, the pointer position has moved to the boundary position (2), and then beyond the predetermined threshold position to 1.73 in example 1010.

To determine whether the pointer position has moved beyond the predetermined threshold position for the boundary position, the computing device compares the pointer position to the predetermined threshold position. If the pointer position has not moved beyond the predetermined threshold position, then the method 300 loops back to operation 310 for the next pointer position. If the pointer position has moved beyond the predetermined threshold position, then at operation 312 the computing device causes the first graphical element to move from the boundary position to the same position as the pointer and continue to move with the pointer during selection of the first graphical element.

Returning to FIG. 3, the computing device continues cycling through the operations 306-312 until the first graphical element is no longer selected, the GUI or application is closed, or another operation is performed that terminates selection of the first graphical element.

Figure 13:
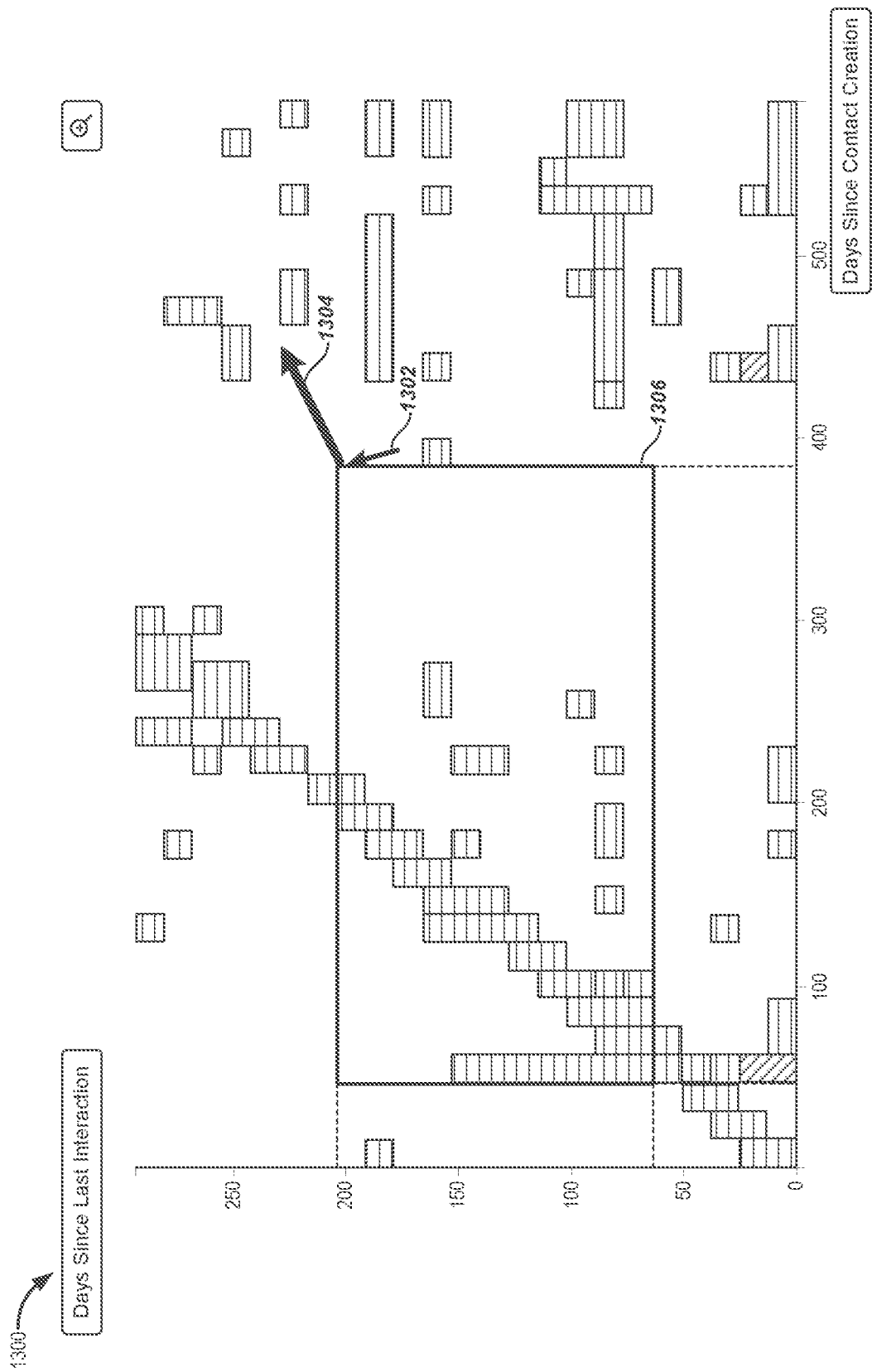
FIG. 13 illustrates an example GUI, according to some example embodiments.

The example GUIs shown in FIGS. 4-10 and described above relate to one dimensional movement of a pointing device. Example embodiments can also be used in a two-dimensional scenario. For example, FIG. 13 shows a heatmap 1300 where each block represents a certain number of customers indicated by a color (color not shown in the black and white depiction in FIG. 13). A user, using a pointing device, can cause a pointer 1302 to increase or decrease the size of a selection 1306 in a two-dimensional direction. For example, the pointer 1302 can be moved in the direction indicated by the arrow 1304 or in a direction in the opposite of the direction indicated by the arrow 1304. Example boundary positions in FIG. 13 may include values of 100, 200, 300, 400, 500 on the x-axis, 50, 100, 150, 200, 250 on the y-axis, and/or other values.

Example pseudocode for a function onMousePositionChange that may be used in some example embodiments is described below. For this example, we assume that a variable for the boundary position has a value of 20 and a variable for the threshold position has a value of 2. Furthermore, we assume that the function onMousePositionChange is called every time the mouse position changes during a selection (e.g., while the mouse button is held down). The function onMousePositionChange has a parameter MousePositionX that contains the position of the mouse pointer on the x axis.

Additionally, we have a function SetSelectionSlider. This function moves the selection slider to the position on the x axis provided in the parameter MousePositionX. In one example, the selection slider is the graphical element 708 in FIG. 8.

The example pseudocode comprises:

```
var LastMousePositionX // Variable used for remembering
the last mouse position
var Boundary = 20
var Threshold = 2
function onMousePositionChange(MousePositionX){
    // if MousePositton is within the threshold of the boundary
    // Check if we have crossed the boundary
    if (absolute(Boundary - MousePositionX) < Threshold
        and ((LastMousePositionX < Boundary < MousePositionX
        or (LastMousePositionX > Boundary > MousePositionX)) {
        // If we have use the boundary value for selection
        SetSelectionSlider(Boundary)
    } else {
        // If not use the mouse position for selection
        SetSelectionSlider(MousePositionX)
        // and remember the mouse position
        LastMousePositionX = MousePositionX
    }
}
```

Embodiments described herein describe methods performed by a computing device. In some embodiments the computing device may be the computing device 110. In other embodiments the computing device may be a server computer, such as the application server 120 or the web server 122 of the server system 102. In yet other embodiments the methods described herein may be performed by a combination of computing devices.

The following examples describe various embodiments of methods, machine-readable media, and systems (e.g., machines, devices, or other apparatus) discussed herein.

Example 1

A method comprising:
detecting, by a computing device, a selection, via a pointer, of a first graphical element in a graphical user interface (GUI);
detecting, by the computing device, movement of the pointer during the selection of the first graphical element in the GUI, wherein a position of the first graphical element is set to a position of the pointer in the GUI such that the first graphical element moves with the movement of the pointer during the selection of the first graphical element;
for each position of the pointer during the selection of the first graphical element, determining, by the computing device, whether the position of the pointer corresponds to a boundary position in the GM;
based on determining that the position of the pointer corresponds to the boundary position in the GUI, setting the position of the first graphical element to the boundary position even though the pointer continues to move beyond the boundary position during the selection of the first graphical element;
determining, by the computing device, that the position of the pointer has moved beyond a predetermined threshold position for the boundary position; and
causing, by the computing device, the first graphical element to move from the boundary position to the position of the pointer and continue to move with the pointer during the selection of the first graphical element.

Example 2

A method according to Example 1, wherein the boundary position is a numerical value in the GUI, a position of a line of a grid of the GUI, or a position of a second graphical element in the GUI.

Example 3

A method according to any of the previous examples, wherein the boundary position is a position on an x axis or a position on a y axis.

Example 4

A method according to any of the previous examples, wherein the predetermined threshold position for the boundary position is based on a number of pixels, a font size, a percentage of a display size of the GUI, a percentage of a size of the first graphical element, or a percentage of a size of a graph or chart.

Example 5

A method according to any of the previous examples, wherein determining whether the position of the pointer corresponds to the boundary position in the GUI comprises comparing the position of the pointer and an x-axis value of the boundary position to determine whether the position of the pointer on the x axis corresponds to the x-axis value of the boundary position.

Example 6

A method according to any of the previous examples, wherein movement of the pointer is via a pointer device comprising a mouse, trackball, joystick, touchpad, or light pen.

Example 7

A method according to any of the previous examples, wherein the predetermined threshold position is a predetermined distance away from the boundary position based on a direction of movement of the pointer.

Example 8

A method according to any of the previous examples, wherein the pointer is displayed separate from the first graphical element when the pointer continues to move beyond the boundary position during the selection of the first graphical element.

Example 9

A computing device comprising:
a memory that stores instructions; and
one or more processors configured by the instructions to perform operations comprising:
  detecting a selection, via a pointer, of a first graphical element in a graphical user interface (GUI);
  detecting movement of the pointer during the selection of the first graphical element in the GUI, wherein a position of the first graphical element is set to a position of the pointer in the GUI such that the first graphical element moves with the movement of the pointer during the selection of the first graphical element;
  for each position of the pointer during the selection of the first graphical element, determining whether the position of the pointer corresponds to a boundary position in the GUI;
  based on determining that the position of the pointer corresponds to the boundary position in the GUI, setting the position of the first graphical element to the boundary position even though the pointer continues to move beyond the boundary position during the selection of the first graphical element;
  determining that the position of the pointer has moved beyond a predetermined threshold position for the boundary position; and
  causing the first graphical element to move from the boundary position to the position of the pointer and continue to move with the pointer during the selection of the first graphical element.

Example 10

A computing device according to any of the previous examples, wherein the boundary position is a numerical value in the GUI, a position of a line of a grid of the GUI, or a position of a second graphical element in the GUI.

Example 11

A computing device according to any of the previous examples, wherein the boundary position is a position on an x axis or a position on a y axis.

Example 12

A computing device according to any of the previous examples, wherein the predetermined threshold position for the boundary position is based on a number of pixels, a font size, a percentage of a display size of the GUI, a percentage of a size of the first graphical element, or a percentage of a size of a graph or chart.

Example 13

A computing device according to any of the previous examples, wherein determining whether the position of the pointer corresponds to the boundary position in the GUI comprises comparing the position of the pointer and an x-axis value of the boundary position to determine whether the position of the pointer on the x axis corresponds to the x-axis value of the boundary position.

Example 14

A computing device according to any of the previous examples, wherein the pointer device is a mouse, trackball, joystick, touchpad, or light pen.

Example 15

A computing device according to any of the previous examples, wherein the predetermined threshold position is a predetermined distance away from the boundary position based on a direction of movement of the pointer.

Example 16

A computing device according to any of the previous examples, wherein the pointer is displayed separate from the first graphical element when the pointer continues to move beyond the boundary position during the selection of the first graphical element.

Example 17

A non-transitory computer-readable medium comprising instructions stored thereon that are executable by at least one processor to cause a computing device to perform operations comprising:
  detecting a selection, via a pointer, of a first graphical element in a graphical user interface (GUI);
  detecting movement of the pointer during the selection of the first graphical element in the GUI, wherein a position of the first graphical element is set to a position of the pointer in the GUI such that the first graphical element moves with the movement of the pointer during the selection of the first graphical element;
  for each position of the pointer during the selection of the first graphical element, determining whether the position of the pointer corresponds to a boundary position in the GUI;
  based on determining that the position of the pointer corresponds to the boundary position in the GUI, setting the position of the first graphical element to the boundary position even though the pointer continues to move beyond the boundary position during the selection of the first graphical element;
  determining that the position of the pointer has moved beyond a predetermined threshold position for the boundary position; and causing the first graphical element to move from the boundary position to the position of the pointer and continue to move with the pointer during the selection of the first graphical element.

Example 18

A non-transitory computer-readable medium according to any of the previous examples, wherein the boundary position is a numerical value in the GUI, a position of a line of a grid of the GUI, or a position of a second graphical element in the GUI.

Example 19

A non-transitory computer-readable medium according to any of the previous examples, wherein the predetermined threshold position is a predetermined distance away from the boundary position based on a direction of movement of the pointer.

Example 20

A non-transitory computer-readable medium according to any of the previous examples, wherein the pointer is displayed separate from the first graphical element when the pointer continues to move beyond the boundary position during the selection of the first graphical element.

Figure 11:
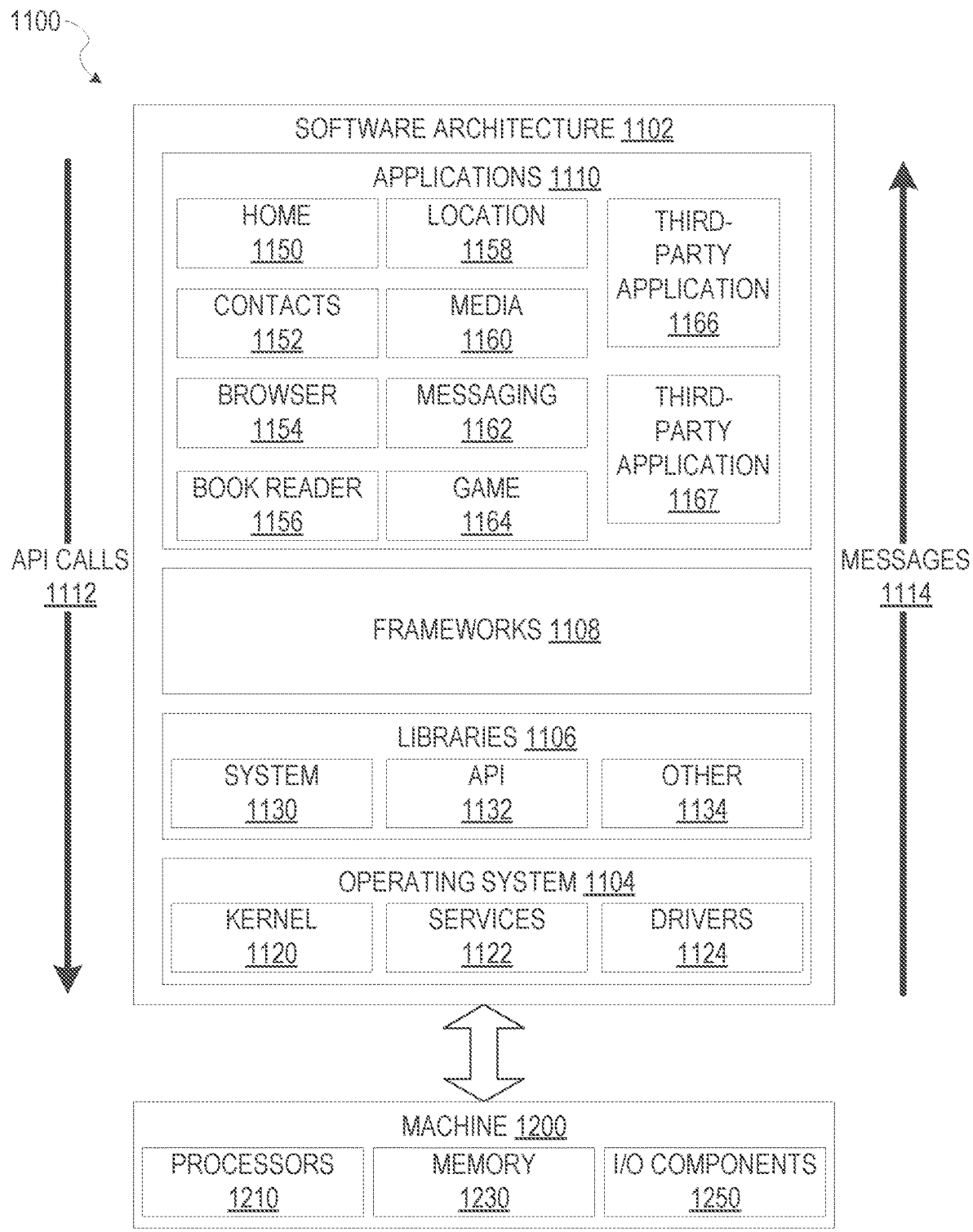
FIG. 11 is a block diagram illustrating an example of a software architecture that may be installed on a machine, according to some example embodiments, configured to provide interaction mechanisms for pointer control.

FIG. 11 is a block diagram 1100 illustrating a software architecture 1102, which can be installed on any one or more of the devices described above. For example, in various embodiments, the computing devices 110, server system 102, and servers 118, 120 and 122 may be implemented using some or all of the elements of the software architecture 1102. FIG. 11 is merely a non-limiting example of a software architecture, and it will be appreciated that many other architectures can be implemented to facilitate the functionality described herein. In various embodiments, the software architecture 1102 is implemented by hardware such as a machine 1200 of FIG. 12 that includes processors 1210, memory 1230, and I/O components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render two-dimensional (2D) and three-dimensional (3D) graphic content on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphical user interface (GUI) functions, high-level resource management, high-level location services, and so forth. The frameworks 1108 can provide a broad spectrum of other APIs that can be utilized by the applications 1110, some of which may be specific to a particular operating system 1104 or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as third-party applications 1166 and 1167. According to some embodiments, the applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1166 can invoke the API calls 1112 provided by the operating system 1104 to facilitate functionality described herein.

Figure 12:
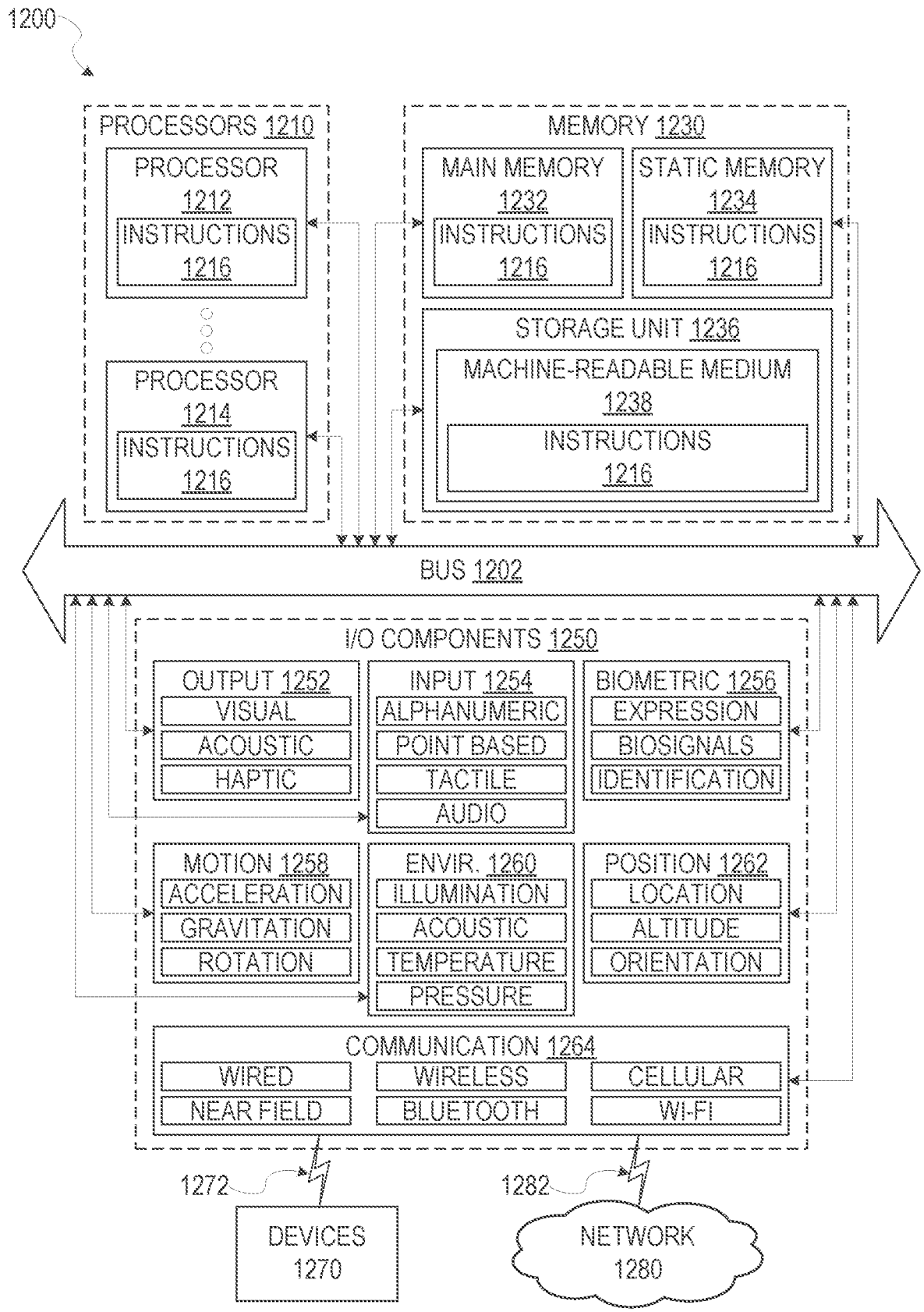
FIG. 12 illustrates a diagrammatic representation of a machine, in the form of a computer system, within which a set of instructions may be executed for causing the machine to perform any one or more of the methodologies discussed herein, according to some example embodiments.

FIG. 12 is a block diagram illustrating components of a machine 1200, according to some embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1216 (e.g., software, a program, an application 1110, an apples, an app, or other executable code) for causing the machine 1200 to perform any one or more of the methodologies discussed herein can be executed. In alternative embodiments, the machine 1200 operates as a standalone device or can be coupled (e.g., networked) to other machines. In a networked deployment, the machine 1200 may operate in the capacity of a server system 102, an API server 118, an application server 120, a web server 122, and the like, or a computing device 110 in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute the instructions 1216 contemporaneously. Although FIG. 12 shows multiple processors 1210, the machine 1200 may include a single processor 1210 with a single core, a single processor 1210 with multiple cores (e.g., a multi-core processor 1210), multiple processors 1212, 1214 with a single core, multiple processors 1210, 1212 with multiple cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, the communication components 1264 include wired communication components, wireless communication components, cellular communication components, near field communication (NFC) components, BLUETOOTH® (e.g., BLUETOOTH® Low Energy) components, WI-FI® components, and other communication components to provide communication via other modalities. The devices 1270 may be another machine 1200 or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include radio frequency identification (UM) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via signal triangulation, location via detecting a BLUETOOTH® or NFC beacon signal that may indicate a particular location, and so forth.

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the machine-readable medium 1238 should be considered as being transportable from one physical location to another. Additionally, since the machine-readable medium 1238 is tangible, the machine-readable medium 1238 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   detecting, by a computing device, a selection, via a graphical depiction of a pointer, of a graphical element in a graphical user interface (GUI), the selection comprising a press and hold action of an element of a pointer device or touch screen to select and hold the graphical element using the graphical depiction of the pointer;
   detecting, by the computing device, movement of the graphical depiction of the pointer during the selection of the graphical element in the GUI via the press and hold action causing the graphical element to move together with the movement of the graphical depiction of the pointer during the selection of the graphical element;
   for each position of the graphical depiction of the pointer during the selection of the graphical element, determining, by the computing device, whether the position of the graphical depiction of the pointer corresponds to a predefined location in the GUI;
   based on determining that the position of the graphical depiction of the pointer corresponds to the predefined location in the GUI, setting the position of the graphical element to display at a static position of the predefined location and causing the graphical depiction of the pointer to move independent of the graphical element beyond where the position of the graphical element is displayed at the static position of the predefined location during continued selection of the graphical element via the press and hold action, wherein the graphical depiction of the pointer is displayed separate from the graphical element when the graphical depiction of the pointer continues to move beyond the predefined location during the continued selection of the graphical element;
   determining, by the computing device, that the position of the graphical depiction of the pointer has moved beyond a predetermined threshold distance from the predefined location where the position of the graphical element is displayed at the static position; and
   causing, by the computing device, the graphical element to move from the static position of the predefined location to the position of the graphical depiction of the pointer and continue to move together with the graphical depiction of the pointer during the continued selection of the graphical element.

2. The method of claim 1, wherein the predefined location is a numerical value in the GUI, a position of a line of a grid of the GUI, or a position of a second graphical element in the GUI.

3. The method of claim 1, wherein the predefined location is a position on an x axis or a position on a y axis.

4. The method of claim 1, wherein the predetermined threshold distance from the predefined location is based on a number of pixels, a font size, a percentage of a display size of the GUI, a percentage of a size of the graphical element, or a percentage of a size of a graph or chart.

5. The method of claim 1, wherein determining whether the position of the graphical depiction of the pointer corresponds to the predefined location in the GUI comprises comparing the position of the graphical depiction of the pointer and an x-axis value of the predefined location to determine whether the position of the graphical depiction of the pointer on the x axis corresponds to the x-axis value of the predefined location.

6. The method of claim 1, wherein movement of the graphical depiction of the pointer is via a pointer device comprising a mouse, trackball, joystick, touchpad, or light pen.

7. The method of claim 1, wherein the predetermined threshold distance from the predefined location is based on a direction of movement of the graphical depiction of the pointer.

8. A computing device comprising:
   one or more processors of a machine; and
   a hardware storage device storing instructions that, when executed by the one or more processors; causes the one or more processors to perform operations comprising:
   detecting a selection, via a graphical depiction of a pointer, of a graphical element in a graphical user interface (GUI), the selection comprising a press and hold action of an element of a pointer device or touch screen to select and hold the graphical element using the graphical depiction of the pointer;
   detecting movement of the graphical depiction of the pointer during the selection of the graphical element in the GUI via the press and hold action causing the graphical element to move together with the movement of the graphical depiction of the pointer during the selection of the graphical element;
   for each position of the graphical depiction of the pointer during the selection of the graphical element, determining whether the position of the graphical depiction of the pointer corresponds to a predefined location in the GUI;
   based on determining that the position of the graphical depiction of the pointer corresponds to the predefined location in the GUI, setting the position of the graphical element to display at a static position of the predefined location and causing the graphical depiction of the pointer to move independent of the graphical element beyond where the position of the graphical element is displayed at the static position of the predefined location during continued selection of the graphical element via the press and hold action, wherein the graphical depiction of the pointer is displayed separate from the graphical element when the graphical depiction of the pointer continues to move beyond the predefined location during the continued selection of the graphical element;

determining that the position of the graphical depiction of the pointer has moved beyond a predetermined threshold distance from the predefined location where the position of the graphical element is displayed at the static position; and causing the graphical element to move from the static position of the predefined location to the position of the graphical depiction of the pointer and continue to move together with the graphical depiction of the pointer during the continued selection of the graphical element.

9. The computing device of claim 8, wherein the predefined location is a numerical value in the GUI, a position of a line of a grid of the GUI, or a position of a second graphical element in the GUI.

10. The computing device of claim 8, wherein the predefined location is a position on an x axis or a position on a y axis.

11. The computing device of claim 8, wherein the predetermined threshold distance from the predefined location is based on a number of pixels, a font size, a percentage of a display size of the GUI, a percentage of a size of the graphical element, or a percentage of a size of a graph or chart.

12. The computing device of claim 8, wherein determining whether the position of the graphical depiction of the pointer corresponds to the predefined location in the GUI comprises comparing the position of the graphical depiction of the pointer and an x-axis value of the predefined location to determine whether the position of the graphical depiction of the pointer on the x axis corresponds to the x-axis value of the predefined location.

13. The computing device of claim 8, wherein the movement of the graphical depiction of the pointer is via a pointer device comprising a mouse, trackball, joystick, touchpad, or light pen.

14. The computing device of claim 8, wherein the predetermined threshold distance from the predefined location is based on a direction of movement of the graphical depiction of the pointer.

15. A non-transitory computer-readable medium comprising instructions stored thereon that are executable by at least one processor to cause a computing device to perform operations comprising:

detecting a selection, via a graphical depiction of a pointer, of a graphical element in a graphical user interface (GUI), the selection comprising a press and hold action of an element of a pointer device or touch screen to select and hold the graphical element using the graphical depiction of the pointer;

detecting movement of the graphical depiction of the pointer during the selection of the graphical element in the GUT via the press and hold action causing the graphical element to move together with the movement of the graphical depiction of the pointer during the selection of the graphical element;

for each position of the graphical depiction of the pointer during the selection of the graphical element, determining whether the position of the graphical depiction of the pointer corresponds to a predefined location in the GUI;

based on determining that the position of the graphical depiction of the pointer corresponds to the predefined location in the GUI, setting the position of the graphical element to display at a static position of the predefined location and causing the graphical depiction of the pointer to move independent of the graphical element beyond where the position of the graphical element is displayed at the static position of the predefined location during continued selection of the graphical element via the press and hold action, wherein the graphical depiction of the pointer is displayed separate from the graphical element when the graphical depiction of the pointer continues to move beyond the predefined location during the continued selection of the graphical element;

determining that the position of the graphical depiction of the pointer has moved beyond a predetermined threshold distance from the predefined location where the position of the graphical element is displayed at the static position; and causing the graphical element to move from the static position of the predefined location to the position of the graphical depiction of the pointer and continue to move together with the graphical depiction of the pointer during the continued selection of the graphical element.

16. The non-transitory computer-readable medium of claim 15, wherein the predefined location is a numerical value in the GUI, a position of a line of a grid of the GUI, or a position of a second graphical element in the GUI.

17. The non-transitory computer-readable medium of claim 15, wherein the predetermined threshold distance from the predefined location is based on a direction of movement of the graphical depiction of the pointer.

* * * * *